United States Patent [19]

Rodenbeck

[11] 4,351,103

[45] Sep. 28, 1982

[54] METHOD AND APPARATUS FOR SUPPORTING SLOT LINER CUFFS DURING COIL INSERTION

[75] Inventor: Philip G. Rodenbeck, Fort Wayne, Ind.

[73] Assignee: General Electric Company, Fort Wayne, Ind.

[21] Appl. No.: 173,053

[22] Filed: Jul. 28, 1980

[51] Int. Cl.³ ............................................. H02K 15/06
[52] U.S. Cl. ....................................... 29/596; 29/732
[58] Field of Search ................... 29/596, 732, 734, 736

[56] References Cited

U.S. PATENT DOCUMENTS 3,324,536 6/1967 Hill .
3,484,923 12/1969 Peters .................................... 29/732
3,593,405 7/1971 Hahn .

*Primary Examiner*—Lowell A. Larson

*Attorney, Agent, or Firm*—Ralph E. Krisher, Jr.

[57] ABSTRACT

A method and apparatus for protecting the slot liner cuffs during insertion of prewound coils in the manufacture of stators for electric motors and other dynamoelectric apparatus. In order to protect the slot liner cuffs, which protrude beyond the face of the magnetic core, a plurality of movable fingers are positioned between the cuffs of those stator slots which have the greatest slot fill. As the windings are pulled into the appropriate slots of the magnetic core, they ride over and are at least partially supported by the highly polished surfaces of the fingers, which are in close proximity to the liner cuffs and extend slightly beyond the ends of the cuffs. This prevents the full force of the coil from being exerted against the cuffs as the coil is pulled into the slots, thereby avoiding damage to the cuffs which may otherwise result in exposing the wires of the coil to the sharp edges of the stator core.

4 Claims, 6 Drawing Figures

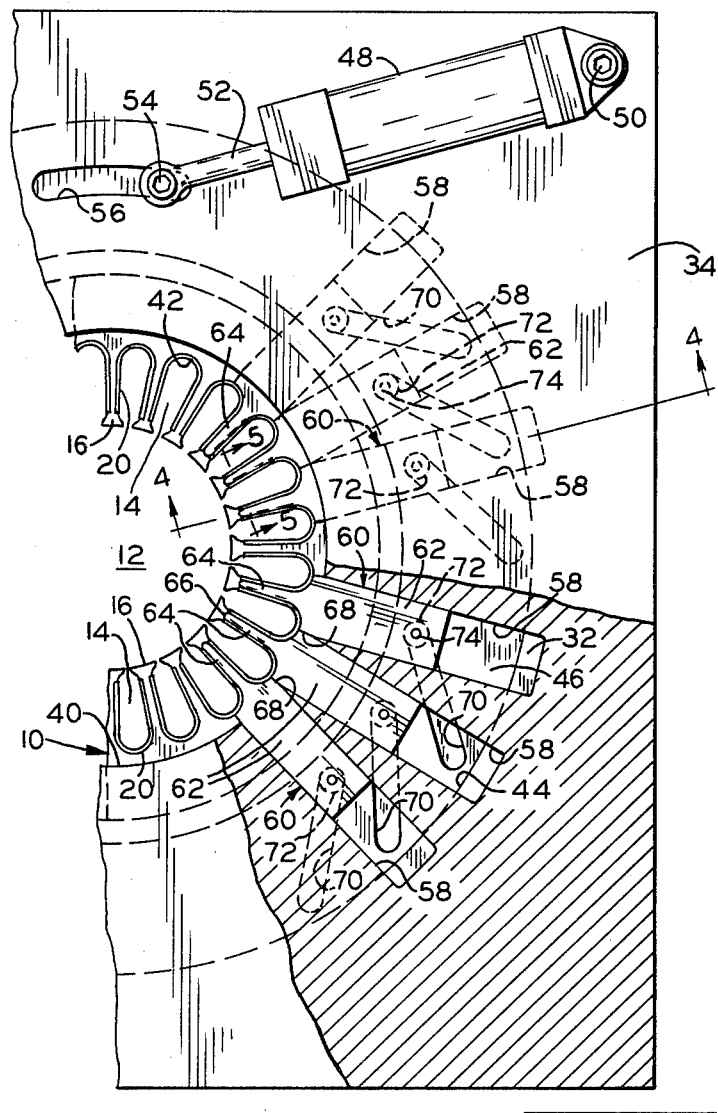
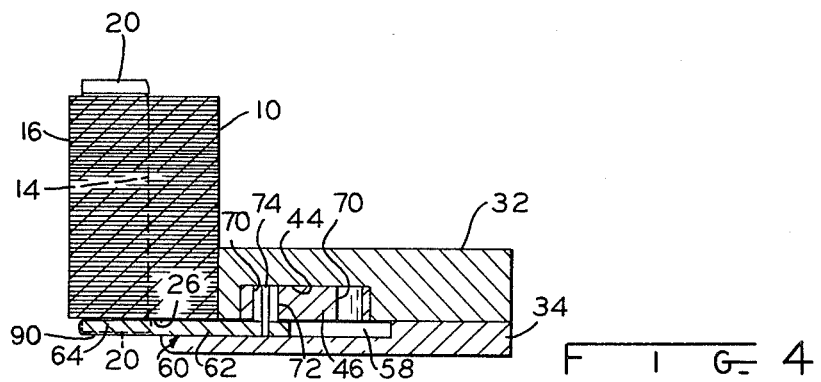
FIG. 2
FIG. 4

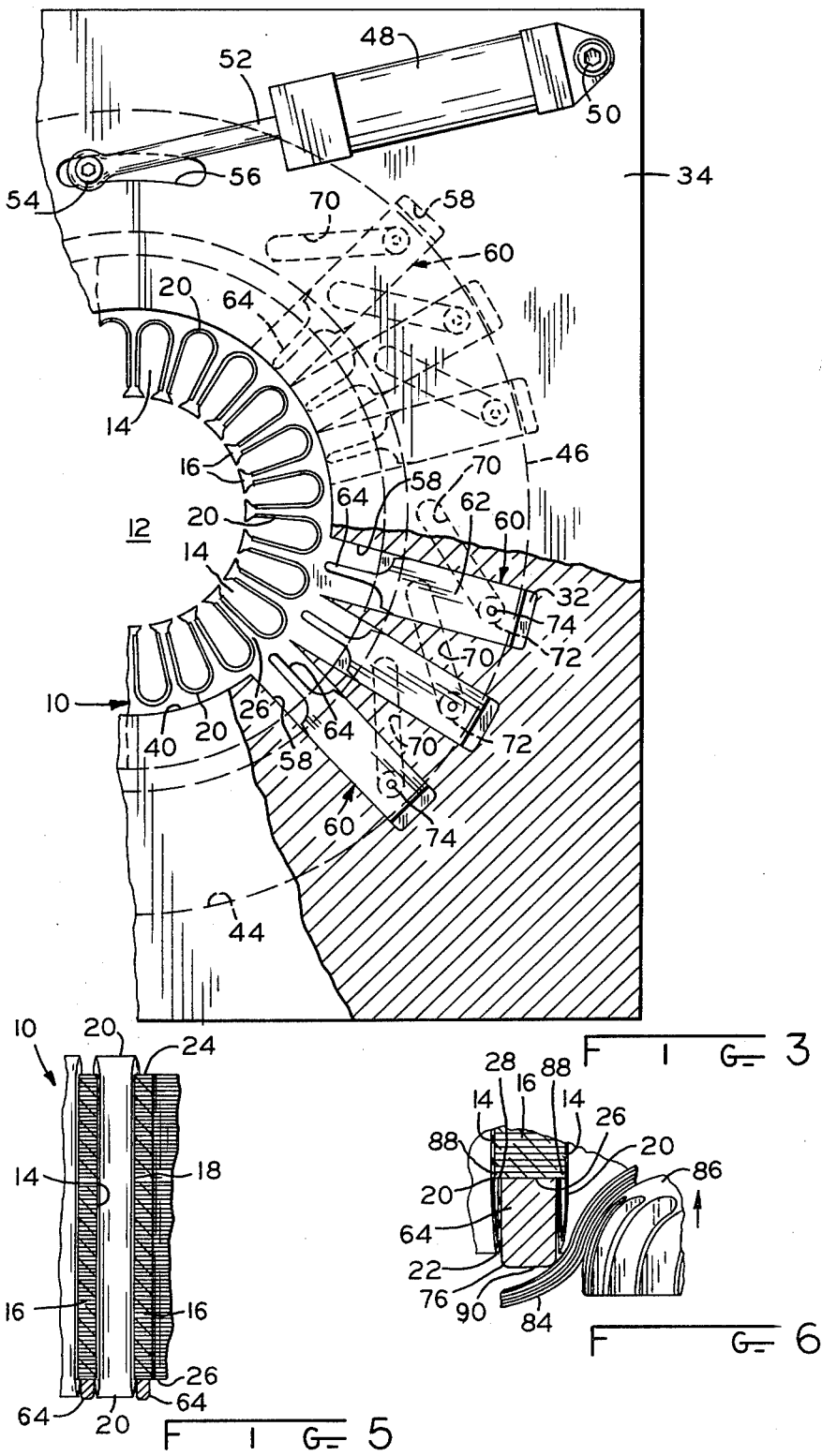

METHOD AND APPARATUS FOR SUPPORTING SLOT LINER CUFFS DURING COIL INSERTION

BACKGROUND OF THE INVENTION

The present invention relates to a method and apparatus for inserting coils in the slots of a stator, and in particular to protection of the slot liner cuffs during insertion.

The magnetic cores for stators are typically made of a stack of steel or iron laminations into which a central bore and a circular array of slots opening into the bore have been stamped or machined. The slots receive windings of insulated copper or aluminum wire, which have been prewound by any one of a number of prior art processes. One such process is known as the wind and shed technique wherein turns of wire are wound around a stepped coil form assembly by means of a flyer, and the coils are shed off the end of the form into a coil transfer and insertion device. The following U.S. patents, which are owned by the assignee of the present application, disclose exemplary prior art wind and shed apparatus: U.S. Pat. Nos. 3,514,837; 3,672,040; 3,672,027; 3,765,080; Re.29,007 and 3,579,818. These patents are expressly incorporated by reference into the present application.

As the coils are being wound, they drop into a transfer and insertion device, which comprises a plurality of fingers arranged circularly about a stripper element. The insertion device is inserted into the central bore of the stator with the fingers being positioned at the ends of the stator teeth so as to guide the coils as they are inserted into the slots. The stripper element is extended into and through the central bore of the stator carrying with it the prewound coils, which are pulled over one face of the stator and into the slots. After insertion of the wedges, the insertion device is retracted out of the stator. Injection apparatus which is typical of that in wide use throughout the industry is disclosed in U.S. Pat. Nos. 3,324,536; 3,151,638 and 3,722,063. These patents are expressly incorporated by reference in the present application.

Since the corners of the slots adjacent the faces of the magnet core are quite sharp and often have burrs thereon, it is customary to insert slot liners into the slots prior to insertion of the coils. The slot liners are typically made of Mylar, which serves to insulate the wire from the sidewalls of the slot. The slot liners protrude beyond the faces of the stator core, and these portions are normally doubled over to form a double thickness cuff. The folded over portions of the cuffs expand slightly so as to engage the faces of the core and prevent the cuffs from sliding into the slots. Additionally, the cuffs prevent the wire from scraping against the sharp corners of the slots during insertion of the coils, and prevent the end turns from touching the face of the core when they are pressed into place in the final stages of manufacture of the stator.

One problem which occurs during pressing of the end turns into tight bundles is that of breaking the cuffs when they are bent over and pressed against the face of the core by the end turns. In order to support the cuffs during the final pressing operation, the prior art has employed cuff supports, which swing downwardly or are moved inwardly, as by a slotted cam ring, against the cuffs so as to prevent the cuffs from being bent over or highly stressed. Such cuff supports are disclosed in U.S. Pat. Nos. 3,913,373; 2,980,157; and 3,593,405.

Breakage of the liner cuffs is also a problem during insertion of the coils, and it is this problem that the invention according to the present application solves. When there is a very high slot fill, which occurs when the number of turns and wire diameter is large and the slot size is relatively small, very high frictiinal forces are developed on the wire and on the cuffs of the slot liners during insertion. Typically, this occurs in connection with the larger coils of the main winding, for example, the three largest coils in a five coil main winding.

The coils are initially wound in a generally oval shape, and, because of the type of tooling typically used for insertion, the coils are pulled across the face of the stator core and then up into the slots. This means that the wire must make an abrupt 90° bend or change in direction in order to travel in the axial direction up into the slots. The point at which this change of direction occurs coincides with the slot liner cuffs, which are disposed around the periphery of the slots. Thus, very high frictional and pressing forces are exerted on the slot liner cuffs as the wire is pulled over them, and this may easily result in breakage of the cuffs and the consequential exposure of the sharp edges of the slots to the wire as it is being pulled into the slots. This strips the insulation from the wires and permits the wires to remain in contact with the metal core thereby resulting in a short circuit. Furthermore, increased frictional forces result as the wire is drawn over the slot liner cuffs.

Some potential solutions to the problem of cuff breakage due to high frictional forces during insertion included reshaping the wedge guides so as to provide more available space within the slots during insertion, changing the shape of the winding form so as to change the shape of the prewound coils, and reducing the thickness of the wedge guides. None of these solutions have been satisfactory, however, and the problem of cuff breakage during insertion under high slot fill conditions has persisted.

Accordingly, it is an object of the present invention to provide improved methods and apparatus for inserting prewound coils in the slots of a stator core wherein breakage of the slot liner cuffs is minimized.

It is a further object of the present invention to provide a method and apparatus for inserting coils under high slot fill conditions wherein the coils are supported and guided over the slot liner cuffs in a manner such that high frictional and pressing forces, which would otherwise tend to severely deform and damage the cuffs, are avoided.

It is a further object of the present invention to provide a method and apparatus for inserting coils in stator slots wherein damage to the wires from scraping against the sharp corners of the stator slots is avoided.

A still further object of the present invention is to provide a method and apparatus for inserting coils wherein the frictional forces on the wire as it is being pulled into the slots is minimized.

Yet another object of the present invention is to provide a method and apparatus for protecting the slot liner cuffs during insertion which is capable of easy implementation into existing insertion machinery.

SUMMARY OF THE INVENTION

In carrying out the above and other objects and advantages of the invention, in one preferred form thereof, there is provided a method of inserting prewound coils of wire in the slots of the stator wherein damage to the slot liner cuffs is minimized. The stator slots are provided with slot liners which extend through the core from one face to the other and protrude beyond the faces of the core in the form of cuffs. Typically, the cuffs comprise doubled back portions of the liners and expand slightly so as to lock the liners in position on the stator. A plurality of cuff support fingers, which are in abutment with one of the faces of the core, are positioned adjacent and in close proximity to the cuff portions of at least some of the slot liners, such as those which would otherwise receive high frictional forces during insertion of the coils. As the coils are pulled into the slots of the core and over the cuffs, the wire is in contact with and supported by the highly polished surfaces of the fingers so that the frictional and pressing forces are borne by the fingers rather than the cuffs. This prevents the cuffs from being bent over and broken at the points where the wire makes its abrupt change of direction as it is pulled into the slots.

Preferably, the fingers include highly polished support surfaces which extend beyond the furthest extremity of the respective cuffs in a direction away from and normal to the face of the core against which the fingers are positioned. In order to prevent the inadvertent interference between the cuffs and fingers as the core is positioned for subsequent insertion of the coils, the fingers are preferably initially positioned away from the area occupied by the cuffs, and then moved inwardly to their supporting positions once the core is in place.

The apparatus according to the present invention comprises a support frame for supporting the stator core, a plurality of cuff support fingers connected to the support frame and positioned in a generally circular array, a mechanism for selectively moving the fingers radially inwardly to position them between pairs of adjacent slots and in close proximity to the core and moving the fingers radially outwardly to positions spaced from the slots so that interference with the cuffs will not occur when the core is emplaced. The apparatus also includes a stripper which is movable through the center of the circular array of fingers and through the central bore of the core so as to pull prewound coils of wire into the appropriate slots.

In a preferred embodiment, the support frame includes a lower support element having an opening therein and adapted to support the core such that the central bore of the core is concentric with the opening. The support fingers are positioned radially around the opening and extensible to positions generally in the opening, yet providing sufficient clearance for the stripper to move through the opening, past the fingers and into the central bore of the core. The fingers are moved by means of a ring positioned generally around the opening and having a plurality of cam slots therein, which are connected to the fingers by means of cam followers positioned in the slot for sliding or rolling movement. As the ring is rotated in one direction or the other, such as by a hydraulic or pneumatic piston and cylinder, the cam slots move the fingers inwardly or outwardly, respectively.

BRIEF DESCRIPTION OF THE DRAWINGS

The subject matter which I regard as my invention is particularly pointed out and distinctly claimed in the concluding portion of this specification. My invention itself, however, both as to its organization and method of operation, together with further objects and advantages thereof, may best be understood by reference to the following description taken in connection with the accompanying drawings wherein:

FIG. 2 is an enlarged, fragmentary bottom view along line 2—2 of FIG. 1 wherein the fingers are extended to their operative positions;

FIG. 3 is a view similar to FIG. 2 but wherein the fingers have been retracted to their inoperative positions;

FIG. 4 is a sectional view taken along line 4—4 of FIG. 2 and viewed in the direction of the arrows;

FIG. 5 is a sectional view taken along line 5—5 of FIG. 2 and viewed in the direction of the arrows; and FIG. 6 is an enlarged view showing a coil of wire being pulled over one of the support fingers and into a corresponding slot in the core.

DESCRIPTION OF THE PREFERRED EMBODIMENT

Figure 1:
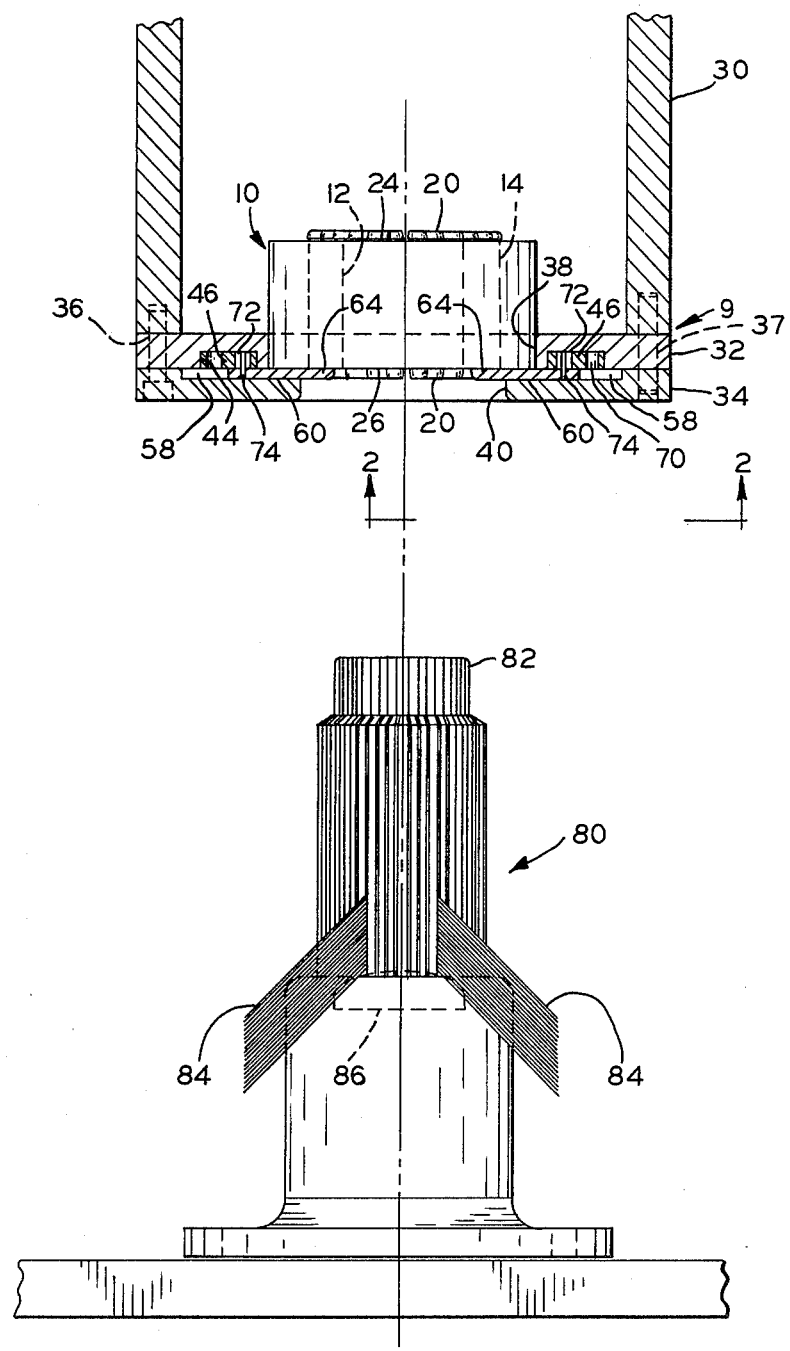
FIG. 1 is an elevational view, partially in section, of one form of apparatus embodying my invention.

With reference now to the drawings, apparatus embodying the present invention will be described. Stator holder 9 is shown supporting a magnetic stator core 10, which comprises a stack of laminations having a central bore 12 and a plurality of slots 14, which are arranged in a circular array as illustrated in FIGS. 2 and 3. The slots 14 are separated by teeth 16, the tips of which define central bore 12. Each of the slots 14 includes a slot liner 18 (FIGS. 5 and 6), which may be made of any suitable material, such as Mylar. Such slot liners 18 are well known in the art and include doubled back portions 20, known as cuffs, which are formed by creasing and folding over the liners 18 at points 22 on both faces 24 and 26 of core 10. Due to the tendency of the cuffs 20 to expand, the folded back edges 28 spread and hook over the faces 24 and 26 of the core, as illustrated in FIG. 6. This locks slot liners 18 in position and prevents them from slipping back into slots 14.

It will be appreciated that the cuffs 20 of cuff slot liners 18 protrude to a considerable degree above the faces 24 and 26 of core 10, and this serves to hold the end turns (not shown) of the stator windings away from core 10 in a manner well known in the art. It should be noted that the present invention is not limited to the particular configuration of slot liner 18 illustrated, but is applicable to other types of suitable liners which function in generally the same manner.

Stator core 10 is supported by stator holder 9, which comprises frame 30, an upper support plate 32 and a lower support plate 34. Support plates 32 and 34 are secured to frame 30 by means of screws 36. Upper support plate 32 includes a central opening 38, which coincides with the outer circumference of core 10 so as to hold it against lateral movement. Lower plate 34 also includes a central opening 40, which is slightly larger in diameter than the outer diameter defined by the rear surfaces 42 of slots 14.

Received in an annular channel 44 in upper plate 32 is a cam ring 46, which is capable of limited rotation about the central axis of stator core 10. Channel 44 is concentric with openings 40 and 38 and with stator core 10. Cam ring 46 is rotated through a relatively short arc by means of hydraulic or pneumatic piston and cylinder 48, which is secured to lower plate 34 by means of bolt 50, and which connects to cam ring 46 through connecting rod 52 and bolt 54, the latter extending through a short, arcuate slot 56. As connecting rod 52 is retracted and extended by piston and cylinder 48, cam ring 46 will rotate to the positions shown in FIGS. 2 and 3, respectively.

Upper plate 32 includes a plurality of slots 58, which are radially oriented relative to the central axis of magnetic core 10. Although the apparatus of the present invention is applicable to a wide variety of stator core configurations, the particular embodiment illustrated is adapted for the slots having the three largest windings of the main windings in a two pole stator. For this reason, twelve such slots 58 are provided, and are positioned in alignment with the teeth 16 adjacent the three slots 14 having the greatest slot fill. Although FIGS. 2 and 3 illustrate only six such slots, there are six identical slots in corresponding positions on the opposite side of the apparatus centerline.

An elongated cuff support member 60 is slidably received in each of slots 58 and comprises a shank portion 62 and a cuff support finger 64 integral with shank portion 62. It will be noted that support finger 64 is shaped to conform to the half-perimeters of the slot liners 18 in adjacent slots 14. When supports 60 are extended radially inwardly as shown in FIG. 2, support fingers 64 extend along their respective teeth 16 and the tips 66 of fingers 64 extend slightly beyond the innermost extremities of slot liner cuffs 20. When cuff supports 60 are extended radially inwardly, their shoulders 68 abut each other so as to increase the rigidity of the assembly against lateral movement as the coils are being inserted.

Cuff supports 60 are extended radially inwardly and retracted radially outwardly by means of cam ring 46, which includes a plurality of slots 70 that are oriented at equal angles to the radial direction. A cam roller 72 is pivotally connected to eac of the shank portions 62 of cuff supports 60 by means of pivot pins 74, and rollers 72 are received in their respective slots 70 for rolling movement. When piston and cylinder 48 retracts, cam ring 46 will rotate in the clockwise direction, as viewed in FIG. 2, and as the slots thereof also move in this direction, they cam roller 72 and, therefore, cuff supports 60, radially inwardly to the positions shown in FIG. 2. Thus, support fingers 64 move radially along the faces of teeth 16 between the slot liner cuffs 20 of adjacent slots 14. As illustrated in FIG. 4, the thickness of support fingers 64 is preferably slightly larger than the extent to which cuffs 20 protrude beyond the face 26 of core 10. For example, the thickness of support fingers 64 may exceed the height of cuffs 20 by 1/32 inch.

When piston and cylinder 48 is extended, cam ring 46 will rotate in the counterclockwise direction as viewed in FIGS. 2 and 3, and the corresponding movement of slots 70 will cam rollers 72 radially outwardly. This causes cuff supports 60 to move radially outwardly to the positions illustrated in FIG. 3. It will be noted that the tips 66 of support finger 64 are spaced from slots 14 in the radial direction so that interference with cuffs 20 as stator core 10 is emplaced is avoided.

Cam supports 60 are preferably made of steel and the fingers 64 are highly polished so as to reduce frictional forces as the wire is pulled thereover, and to avoid abrading the wire insulation. Furthermore, the corners 76 of fingers 64 should be slightly rounded, as illustrated in FIG. 6.

In operation, stator core 10 is either manually or automatically emplaced and secured within stator holder 30, which may be part of an automatic stator loading apparatus, such as that disclosed in U.S. Pat. No. 3,579,818. Prior to the emplacement of stator 10, piston and cylinder 48 is extended so as to move cuff supports 60 radially outwardly thereby causing the tips 66 of support finger 64 to be spaced from slots 14. This enables stator core 10 to be positioned without interference. Either before or after stator core 10 is placed within holder 30, slot liners 18 are inserted within each of the slots 14 as is illustrated in FIG. 5.

Piston and cylinder 48 is then retracted so as to rotate cam ring 46 in the clockwise direction as viewed in FIG. 2. This causes cuff supports 60 to move radially inwardly, and the support fingers 64 to move along teeth 16 to positions adjacent and in close proximity to the cuffs 20 on both sides thereof. Although cuff supports 62 could be provided for each slot 14 of the core 10, under most conditions, they will be necessary only for those slots 14 having very high fill. Core 10 is then lowered over insertion apparatus 80 by lowering stator holder 30, or, alternatively, insertion apparatus 80 is raised. In either case, guide fingers 82 are extended through the central bore 12 of core 10 along the tips of teeth 16 in a manner well known in the art.

A plurality of prewound coils of wire, two such coils being shown in FIG. 1, are placed over certain of the fingers 82 in a pattern established during the winding process. To place the coils 84 in stator slots 14, the stripper 86 received centrally of fingers 82 is driven upwardly so that the coils 84 are stripped over fingers 82 and slid into the respective stator slots 14. Coil insertion apparatus 80 can be of any conventional design, such as that described in the aforementioned U.S. Pat. No. 3,324,536.

With specific reference now to FIG. 6, there is illustrated one of coils 84 being pulled upwardly into core 10 by means of stripper 86. As shown, the coil 84 undergoes a rather abrupt change of direction as it is pulled across the face 26 of stator core 10. Without the cuff supports of the present invention, slot liner cuff 20 would be highly stressed as the wire 84 is pulled over its leading edge 22. This is likely to result in breakage of cuff 20, under high slot fill conditions, thereby exposing the sharp corners 88 of teeth 16 to the wire 84. With fingers 64 positioned as shown in FIGS. 1, 2, 4 and 6, however, the coil 84 will be pulled over the rounded corners 76 of fingers 64 and will be supported and guided thereby so that it does not exert bending forces on cuffs 20. Although coil 84 will contact the sides of slot liners 18 as it is pulled into slots 14, the liners 18 are supported by fingers 64 and teeth 16 so that damaging bending will not occur.

Once all of the coils 84 have been inserted into their respective slots 14, stripper 86 is retracted and core 10 and insertion apparatus 80 are moved apart. Cuff supports 60 may then be retracted outwardly by extending piston and cylinder 48 to rotate cam ring 46 in the counterclockwise direction as viewed in FIG. 3 so that the cuff supports 60 will occupy the positions shown in FIG. 3. The above sequence of steps is repeated for succeeding insertion operations on other cores 10.

Although cuff supports 60 are shown actuated in unison by means of cam ring 46, they could be actuated by individual pneumatic or hydraulic cylinders (not shown), if desired. Furthermore, it may not be necessary for the support surfaces 90 of guide fingers 64 to extend beyond the folded over edges 22 of cuffs 20 in certain instances. What is important, however, is that the support fingers 64 support the coils 84 sufficiently so that cuffs 20 will not be stressed to the point where breakage or other damage occurs.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What I claim as new and desire to secure by Letters Patent of the United States is:

1. A method of inserting prewound coils of wire in the slots of a stator assembly including a core having two opposite faces and a plurality of slots extending through the core from one face to the other, and the stator assembly including slot liners in the slots of the core wherein the liners are longer than the slots and include cuffs which protrude beyond the faces of the core, the method comprising: placing the stator in a stator holder having a plurality of cuff supports arranged about a centrally disposed opening, so that the stator bore is aligned with such opening, and so that the plurality of cuff supports are in abutment with one of the faces of the core; moving the cuff supports adjacent to and in close proximity to the cuffs of at least some of the slot liners; relatively moving the stator holder and stator carried thereby with respect to coil injection tooling having previously wound wire coils supported thereon, and thereby interfitting such tooling with the bore of the stator through the centrally disposed stator holder opening; and pulling the coils of wire through the stator holder opening and into the slots of the stator core, over the cuffs of the liners and over the cuff supports, the coils contacting and being supported by the cuff supports as they are pulled over the respective cuffs and into the slots.

2. The method of claim 1 wherein each of said cuff supports includes a smooth support surface which supports and is contacted by the coil as it is pulled into the slot, and the support surface is positioned beyond the furthest extremity of the respective cuff portion in a direction away from and normal to the one face of the core.

3. The method of claim 2 wherein the cuff supports are supported by the one face of the core as the coils are pulled over them and into the slots.

4. Apparatus for inserting prewound coils of wire in the slots of a stator core comprising, in combination:
support frame means for supporting a slotted stator core assembly having a central bore and insulators with cuffs protruding from slots of the core, said frame means having a centrally located opening larger than such stator bore;
a plurality of cuff support fingers connected to said support frame and positioned in a generally circular array about said centrally located opening;
means for selectively moving said cuff support fingers radially inwardly to positions between pairs of adjacent slots and in close proximity to the core and for selectively moving with cuff support fingers radially outwardly to positions spaced from the slots; and
coil injection means for axially inserting prewound coils into the slots of such stator core;
said injection means comprising tooling that includes a plurality of coil injection fingers sized and arranged to pass through said centrally located opening and into the bore of such core;
said injection means further comprising stripper means movable within and along the injection fingers for moving prewound coils, previously placed on the injection fingers, axially along the injection fingers, through said centrally located opening, and along the bore of and into the slots of such stator core;
and wherein said cuff support fingers are spaced from the injection fingers during the insertion operation, and also located to absorb injection forces of the prewound coils as they are injected into the stator slots, whereby cuffs of the insulators carried by such stator core are protected from wire damage.

* * * * *